(12) United States Patent
Noguchi et al.

(10) Patent No.: US 11,667,332 B2
(45) Date of Patent: Jun. 6, 2023

(54) SUBFRAME STRUCTURE

(71) Applicant: HONDA MOTOR CO., LTD., Tokyo (JP)

(72) Inventors: Satoru Noguchi, Wako (JP); Ukyo Watanabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 212 days.

(21) Appl. No.: 17/279,250

(22) PCT Filed: Sep. 27, 2018

(86) PCT No.: PCT/JP2018/036155
§ 371 (c)(1),
(2) Date: Mar. 24, 2021

(87) PCT Pub. No.: WO2020/065900
PCT Pub. Date: Apr. 2, 2020

(65) Prior Publication Data
US 2022/0001928 A1 Jan. 6, 2022

(51) Int. Cl.
  *B62D 21/15* (2006.01)
  *B62D 25/20* (2006.01)
(52) U.S. Cl.
  CPC ....... *B62D 21/152* (2013.01); *B62D 25/2027* (2013.01)
(58) Field of Classification Search
  CPC ... B62D 21/11; B62D 21/152; B62D 25/0207
  See application file for complete search history.

(56) References Cited

U.S. PATENT DOCUMENTS

| 9,604,672 | B2 * | 3/2017 | Kaneko | B62D 21/11 |
| 2017/0183037 | A1 * | 6/2017 | Kato | B62D 25/087 |
| 2019/0061507 | A1 * | 2/2019 | Nitta | H01M 50/24 |

FOREIGN PATENT DOCUMENTS

| CN | 106864592 A | * 6/2017 | ............ B62D 21/11 |
| JP | S64-8475 U | 1/1989 | |

(Continued)

OTHER PUBLICATIONS

International Search Report by ISA/JP dated Oct. 30, 2018, on PCT/JP2018/036155, 1 page.

(Continued)

*Primary Examiner* — Lori L Lyjak
(74) *Attorney, Agent, or Firm* — Rankin, Hill & Clark LLP

(57) ABSTRACT

A subframe structure includes: a pair of right and left vehicle body side frames disposed at side portions of a vehicle body; a pair of right and left longitudinal members extending along the pair of right and left vehicle body side frames at positions centrally spaced apart in a vehicle width direction for a predetermined distance from the vehicle body side frames; and a rear cross-member extending in the vehicle width direction between longitudinally rear portions of the pair of right and left longitudinal members. The rear cross-member has a first attachment portion, an extension portion, and a second attachment portion. The first attachment portion is attached to the longitudinal member, the extension portion extends from the first attachment portion in a laterally outward and upward direction, and the second attachment portion is attached to the vehicle body side frame at a laterally outer end portion of the extension portion.

12 Claims, 4 Drawing Sheets

(56) References Cited

FOREIGN PATENT DOCUMENTS

| | | |
|---|---|---|
| JP | H04-39968 U | 4/1992 |
| JP | 5499726 B2 | 5/2014 |
| JP | 2017-114411 A | 6/2017 |

OTHER PUBLICATIONS

Written Opinion by ISA/JP dated Oct. 30, 2018, on PCT/JP2018/036155, 8 pages.

* cited by examiner

SUBFRAME STRUCTURE

TECHNICAL FIELD

The present invention relates to a subframe structure mounted on a vehicle such as an automobile.

BACKGROUND ART

For example, Patent Literature 1 discloses a vehicle body rear structure in which a rear subframe (perimeter frame) for distributing and absorbing a collision load generated in a rear-end collision is provided between a pair of right and left rear side-frames along a vehicle width direction.

The rear subframe (perimeter frame) disclosed in Patent Literature 1 includes a pair of side frames having right and left vehicular longitudinal front end portions and right and left vehicular longitudinal rear end portions respectively joined to the rear side-frames, and a front frame and a rear frame joined between the pair of side-frames.

CITATION LIST

Patent Literature

Patent Literature 1: Japanese Patent No. 5499726

SUMMARY OF THE INVENTION

Technical Problem

According to the vehicle body rear structure disclosed in Patent Literature 1, the rear subframe is attached to the vehicle body at four points (four mounting points) in total including its front and rear (in the longitudinal direction of the vehicle) and right and left.

This kind of rear subframe with a four-point support structure does not provide sufficient rigidity and strength, for example, for an input load from suspension supported by a rear subframe, and thus may disadvantageously lead to degradation in ride comfort and steering stability.

In view of the above, an object of the present invention is to provide a subframe structure capable of improving the rigidity and strength of the rear side of the vehicle body while suppressing an increase in the overall weight of the vehicle and manufacturing cost.

Solution to Problem

To solve the above problem, there is provided a subframe structure comprising: a pair of right and left vehicle body side frames disposed at side portions of a vehicle body and extending in a longitudinal direction of a vehicle; a pair of right and left longitudinal members extending along the pair of right and left vehicle body side frames at positions centrally spaced apart in a vehicle width direction for a predetermined distance from the vehicle body side frames; and a cross-member extending in the vehicle width direction between longitudinally rear portions of the pair of right and left longitudinal members, wherein the cross-member has a first attachment portion, an extension portion, and a second attachment portion, the first attachment portion being attached to the longitudinal member, the extension portion extending from the first attachment portion in a laterally outward and upward direction, and the second attachment portion being attached to the vehicle body side frame at a laterally outer end portion of the extension portion.

Advantageous Effects of the Invention

According to the present invention, there is provided a subframe structure, which can improve the rigidity and strength of the rear side of the vehicle body while suppressing an increase in the overall weight of the vehicle and manufacturing cost.

DESCRIPTION OF EMBODIMENTS

Next, one embodiment of the present invention is described in detail with reference to the accompanying drawing where appropriate.

Figure 1:
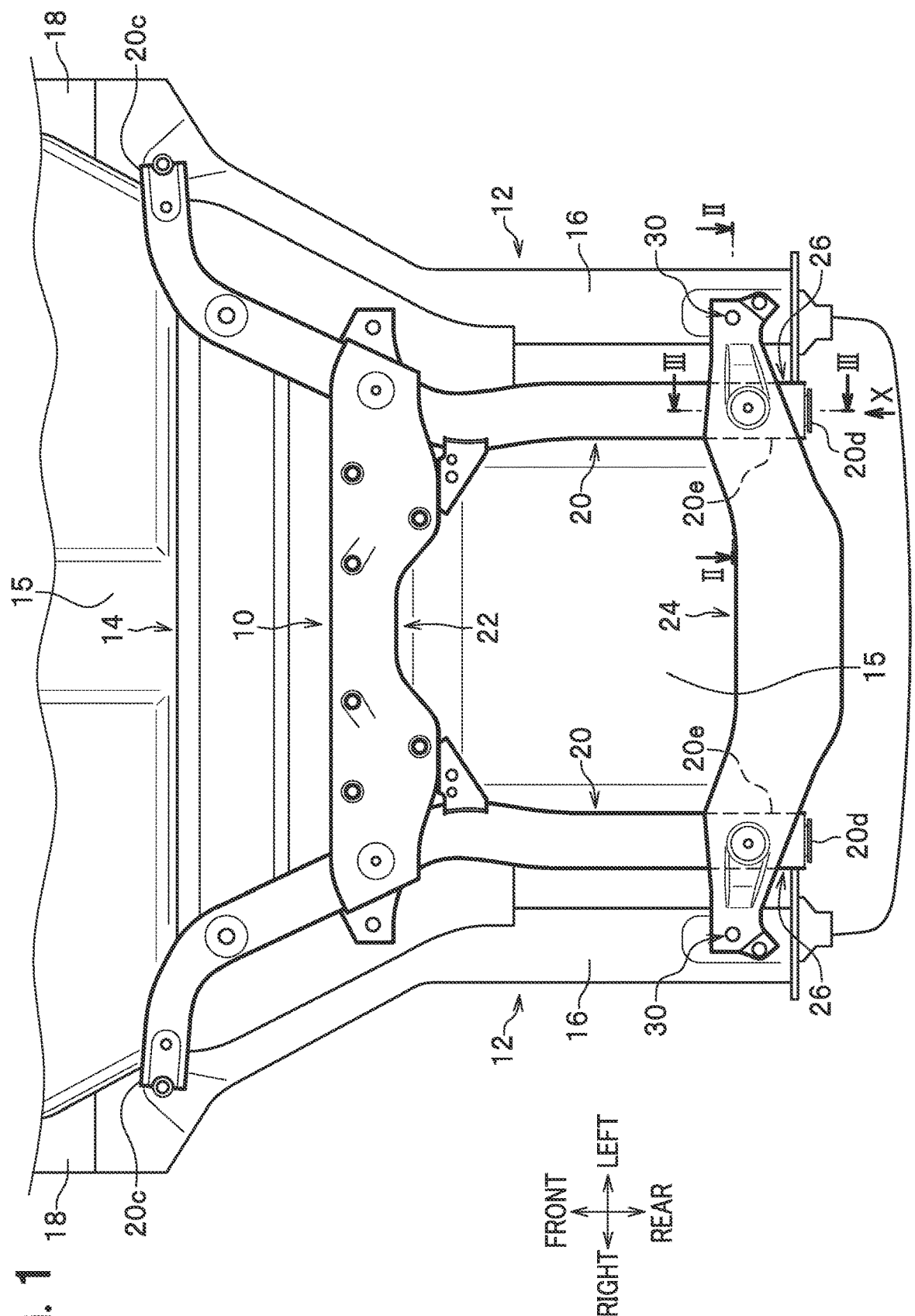
FIG. 1 is a bottom view, as viewed from a bottom side, of a rear side of a vehicle body, in which a rear subframe according to one embodiment of the present invention is assembled.
Figure 2:
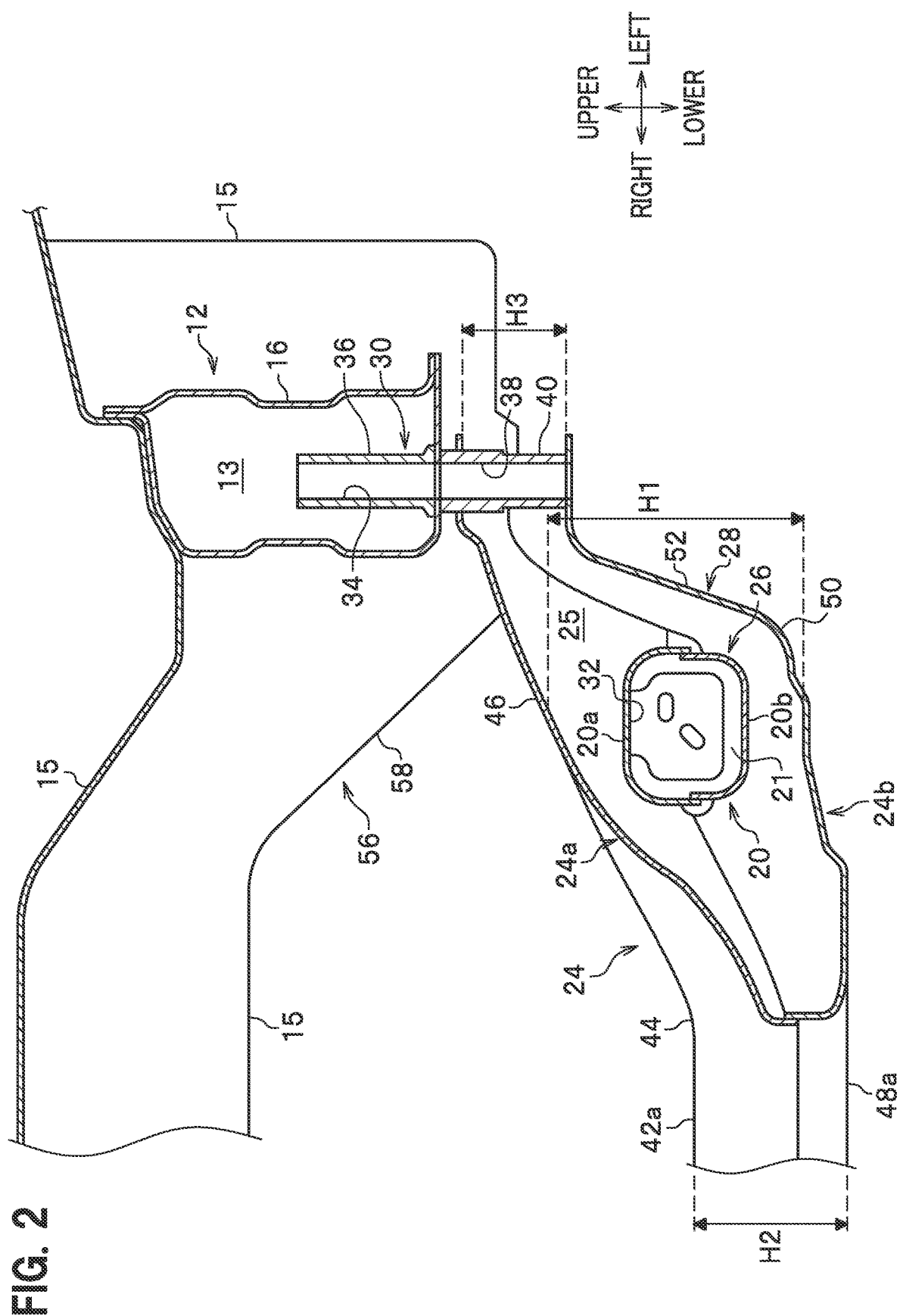
FIG. 2 is a vertical sectional view taken along the line II-II of FIG. 1.
Figure 3:
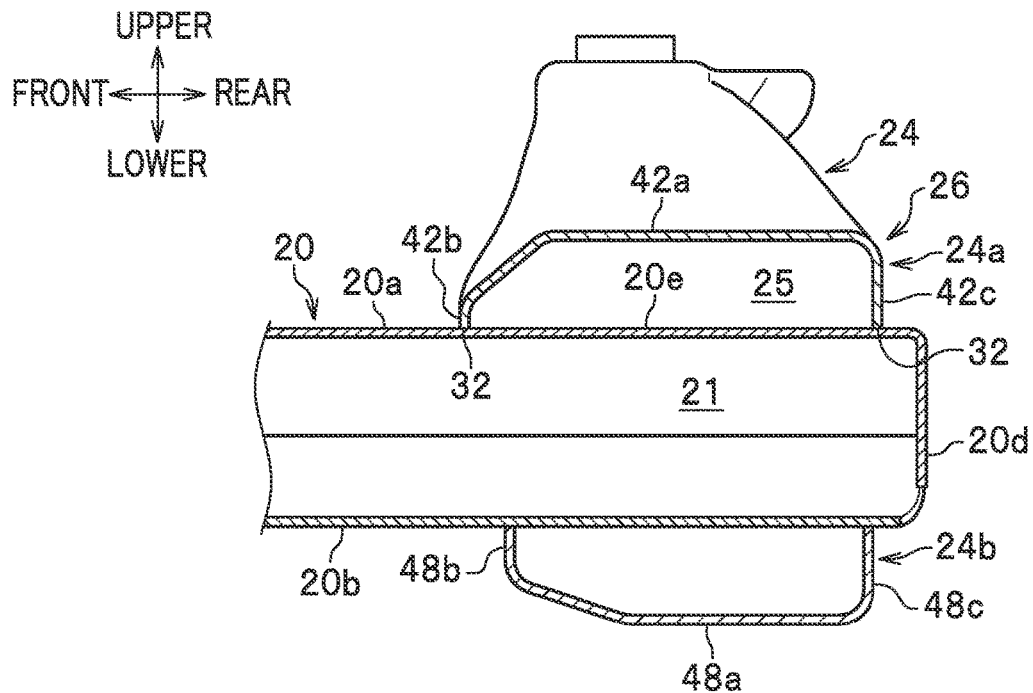
FIG. 3 is a vertical sectional view taken along the line of FIG. 1.

FIG. 1 is a bottom view, as viewed from a bottom side, of a rear side of a vehicle body, in which a rear subframe according to one embodiment of the present invention is assembled, FIG. 2 is a vertical sectional view taken along the line II-II of FIG. 1, and FIG. 3 is a vertical sectional view taken along the line of FIG. 1. In the drawings, front and rear directions refer to corresponding directions in the longitudinal direction (i.e., front-rear direction) of a vehicle, right and left directions refer to corresponding directions in the vehicle width direction (i.e., lateral direction or right-left direction) of the vehicle, and upper and lower directions refer to corresponding directions in the vertical direction (i.e., upper-lower direction) of the vehicle.

As seen in FIG. 1, a rear subframe (subframe) 10 according to one embodiment of the present invention, a pair of right and left vehicle body side frames 12, 12, and a vehicle body cross-member 14 are disposed in a rear side of a vehicle body. A rear floor panel 15 having a generally flat shape is mounted between the pair of right and left vehicle body side frames 12, 12 in the vehicle width direction.

The pair of right and left vehicle body side frames 12, 12 are disposed at side portions of the vehicle body and extend in the longitudinal direction (front-rear direction) of the vehicle. The vehicle body side frames 12, 12 include a pair of right and left rear side frames 16, 16, and a pair of right and left side sills 18, 18. These rear side frames 16, 16 and side sills 18, 18 are connected in the longitudinal direction of the vehicle at the right and left side portions of the vehicle body.

The rear subframe 10 is located laterally inward of the pair of right and left vehicle body side frames 12, 12 and mounted on the lower side of the pair of right and left vehicle body side frames 12, 12. Further, the rear subframe 10 is configured to support rear suspension systems (not shown)

and also to support a power unit (not shown) such as a drive source (e.g., motor and engine) through a vibration isolator (not shown).

As seen in FIG. 1, the rear subframe 10 includes the pair of right and left longitudinal members 20, 20 extending in the longitudinal direction (front-rear direction) of the vehicle, and a cross-member extending in the vehicle width direction between the pair of right and left longitudinal members 20, 20. The cross-member includes a front cross-member 22 fixed to the longitudinally front side of the pair of right and left longitudinal members 20, 20, and a rear cross-member (cross-member) 24 fixed to the longitudinally rear side of the pair of right and left longitudinal members 20, 20.

As seen in FIG. 2, the rear cross-member 24 has a first attachment portion 26, an extension portion 28, and a second attachment portion 30 on each side thereof.

The first attachment portions 26, 26 are configured such that portions of the rear cross-member 24 that are located laterally sideward from a central portion toward right and left ends thereof are attached to the longitudinal members 20, 20 (see FIG. 1). When viewing from a side (that is, from the longitudinal direction of the vehicle), the rear cross-member 24 has a through opening 32 on each side thereof (see FIGS. 2 and 4). The through opening 32 has a generally square or rectangular shape. The through opening 32 is formed to extend in the longitudinal direction of the vehicle through a front wall of the rear cross-member 24 that faces frontward in the longitudinal direction of the vehicle and a rear wall of the rear cross-member 24 that faces rearward in the longitudinal direction of the vehicle (see FIG. 3). Further, the through opening 32 is formed in a position vertically overlapping the first attachment portion 26 (see FIG. 3).

A longitudinally rear portion 20e of each longitudinal member 20 is inserted into the through opening 32 and thus attached to the rear cross-member 24 (see FIGS. 1 and 3). In other words, the longitudinally rear portion 20e of each longitudinal member 20 is fitted into the through opening 32 of the rear cross-member 24. The shape of the through opening 32 of the rear cross-member 24 corresponds to the sectional shape of the longitudinally rear portion 20e perpendicular to the axis of each longitudinal member 20.

According to this embodiment, as seen in FIG. 1, a portion of each longitudinal member 20 that is in proximity to the longitudinally rear end 20d is inserted through the through opening 32 of the rear cross-member 24. However, the present invention is not limited to this specific configuration. The longitudinally rear portion 20e may be the longitudinally rear end 20d of each longitudinal member 20 or a portion of each longitudinal member 20 that is away from the longitudinally rear end 20d and closer to the longitudinally front portion 20c.

As seen in FIG. 2, the extension portion 28 extends from the first attachment portion 26 so as to rise in a laterally outward and upward direction. The extension portion 28 is configured such the cross-sectional height dimension thereof becomes smaller from the first attachment portion 26 toward the second attachment portion 30 (see H1>H3).

The second attachment portion 30 is attached to the vehicle body side frame 12 at a laterally outer end portion of the extension portion 28. A generally cylindrical first collar member 36 having a first through opening 34 is fixed in a closed section 13 of the vehicle body side frame 12. Further, a generally cylindrical second collar member 40 having a second through opening 38 is fixed in a closed section 25 of the rear cross-member 24.

The first collar member 36 and the second collar member 40 are arranged such that they are coaxially and vertically superposed one on top of another in the upper-lower direction. The rear cross-member 24 is fixed to each of the vehicle body side frames 12, 12 by inserting a bolt (not shown) through the first through opening 34 of the first collar member 36 and the second through opening 38 of the second collar member 40 and tightening the bolt with a nut (not shown).

As seen in FIG. 2, the rear cross-member 24 is configured such that the cross-sectional height dimension (H1) at the first attachment portion 26 is larger than the cross-sectional height dimension (H2) at other laterally central portion (H1>H2).

Further, as seen in FIG. 2, the rear cross-member 24 includes an upper cross-member portion 24a located on the upper side and a lower cross-member portion 24b located on the lower side. The closed section 25 is formed inside the upper cross-member portion 24a and the lower cross-member portion 24b.

Figure 4:
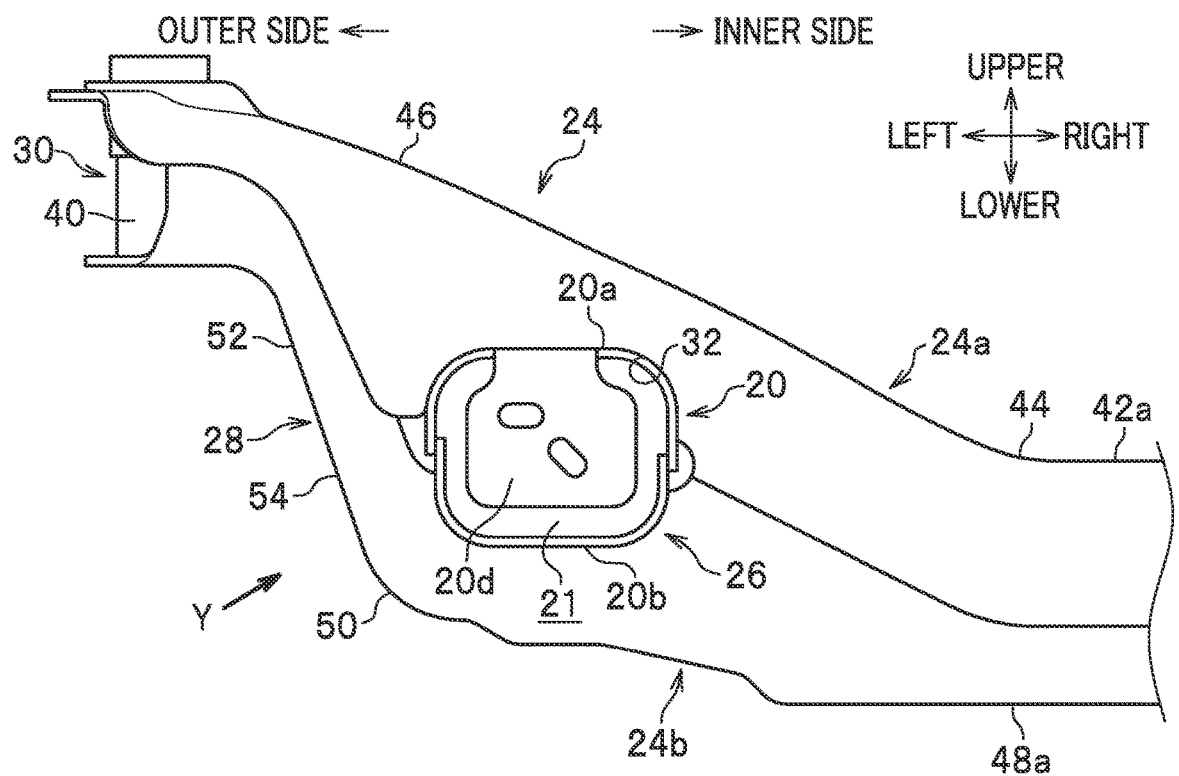
FIG. 4 is a side view in the direction of arrow X in FIG. 1.
Figure 5:
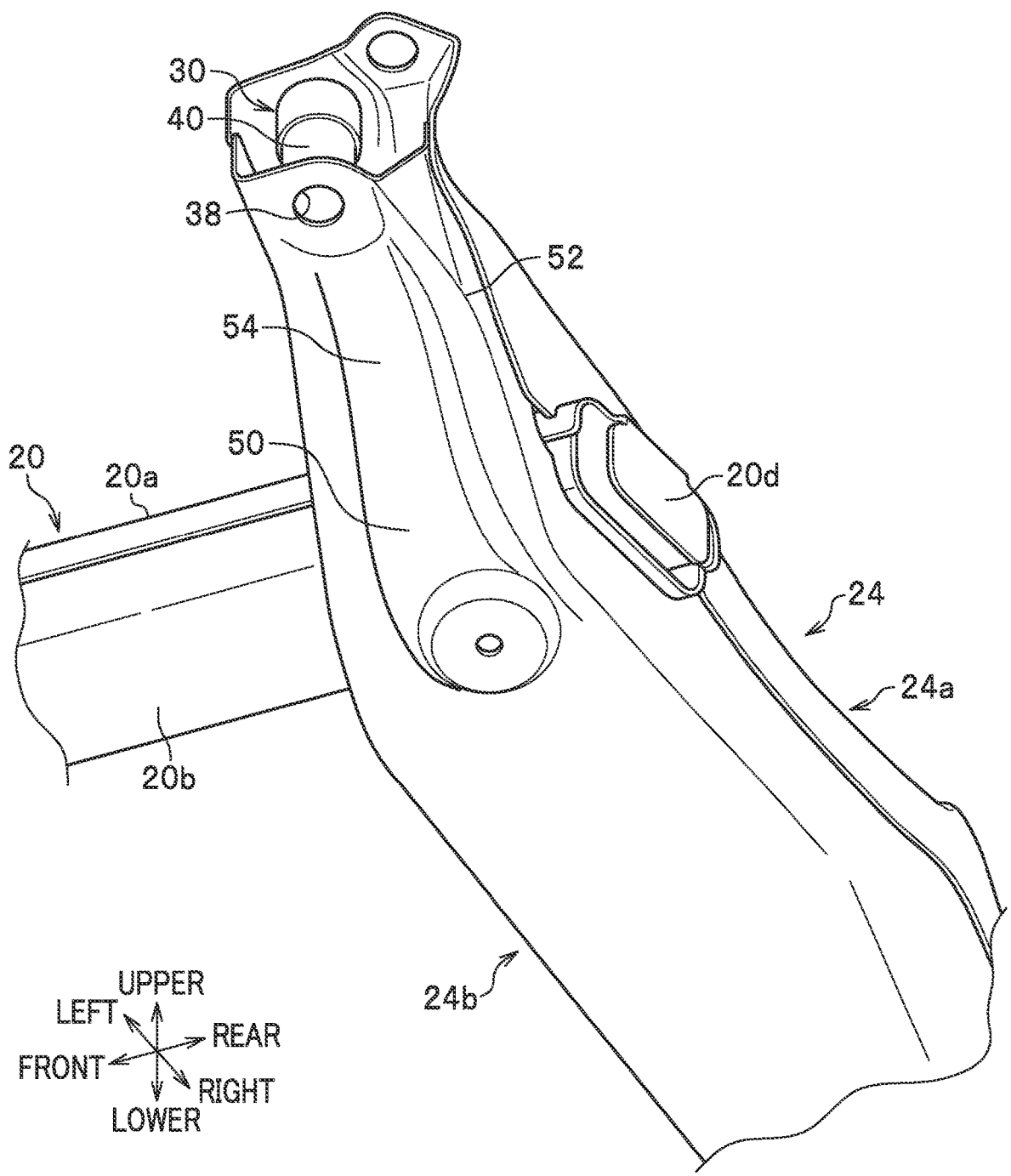
FIG. 5 is a perspective view in the direction of arrow Y in FIG. 4.

FIG. 4 is a side view in the direction of arrow X in FIG. 1, and FIG. 5 is a perspective view in the direction of arrow Y in FIG. 4.

As seen in FIG. 3, the upper cross-member portion 24a includes a ceiling wall 42a, and a front wall 42b and a rear wall 42c that extend continuously from the ceiling wall 42a and opposite to each other in the longitudinal direction of the vehicle. Further, as seen in FIG. 4, the upper cross-member portion 24a has an upper bent portion 44 at a position laterally inward of the first attachment portion 26 to be attached to the longitudinal member 20. An upper extension portion 46 is provided to extend upward from the upper bent portion 44 toward the second attachment portion 30 located at the laterally outer end portion of the extension portion 28.

As seen in FIG. 3, the lower cross-member portion 24b includes a lower bottom wall 48a, and a front wall 48b and a rear wall 48c that extend continuously from the lower bottom wall 48a and opposite to each other in the longitudinal direction of the vehicle. Further, as seen in FIG. 4, the lower cross-member portion 24b has a lower bent portion 50 at a position slightly laterally outward of the first attachment portion 26. A lower extension portion 52 is provided to extend upward from the lower bent portion 50 toward the second attachment portion 30 located at the laterally outer end portion of the extension portion 28.

As seen in FIG. 4, the upper bent portion 44 is disposed laterally inward of the longitudinal members 20, 20. The lower bent portion 50 is disposed laterally outward of the longitudinal members 20, 20.

Further, as seen in FIG. 5, the lower extension portion 52 has a bead 54 extending from the lower bent portion 50 toward the second attachment portion 30. When viewing from the bottom side, the bead 54 extends in the vehicle width direction. The bead 54 is formed by a belt-like protruding portion that protrudes outward.

The front cross-member 22 includes an upper wall whose section perpendicular to the axis thereof is generally U-shape, and a lower wall whose section perpendicular to the axis thereof is generally U-shape, so that a closed section portion (not shown) having a closed section is formed by the upper wall and the lower wall.

The pair of right and left longitudinal members 20, 20 are similar in construction and arranged in a laterally symmetrical manner. Each of the longitudinal members 20, 20 includes an upper wall portion 20a having a U-shaped section, and a lower wall portion 20b having a U-shaped section. The upper wall portion 20a and the lower wall portion 20b are integrally connected (joined) through flange portions to form a closed section 21 inside the longitudinal member 20. Further, longitudinally front end portions 20c of the longitudinal members 20, 20 are located further outside in the vehicle width direction than longitudinally rear end portions of the longitudinal members 20, 20, so that the longitudinal members 20, 20 are arranged in a forwardly divergent configuration.

The pair of right and left longitudinal members 20, 20 extend along the pair of right and left vehicle body side frames 12, 12 at positions centrally spaced apart in the vehicle width direction for a predetermined distance from the vehicle body side frames 12, 12.

The vehicle body cross-member 14 extends in the vehicle width direction between the pair of right and left vehicle body side frames 12, 12. The vehicle body cross-member 14 has right and left sides in the vehicle width direction; the right and left sides are attached to the longitudinal members 20, 20 and the vehicle body side frames 12, 12.

As seen in FIG. 2, a lower surface of the rear floor panel 15 that is located in proximity to the second attachment portion 30 has a slanted side 56 slanting in a laterally central and upward direction. The slanted side 56 has a slanted surface 58 extending to rise upward from the laterally outer side toward the laterally inner side. The slanted side 56 of the rear floor panel 15 and the upper extension portion 46 and the lower bent portion 50 of the rear cross-member 24 are arranged such that they are overlapping in the vertical direction.

The rear subframe 10 according to this embodiment is basically configured as described above, and operational effects thereof are described below.

According to this embodiment, the rear cross-member 24 extending in the vehicle width direction is provided between the longitudinally rear portions 20e, 20e of the pair of right and left longitudinal members 20, 20. The rear cross-member 24 has the first attachment portion 26 attached to each longitudinal member 24, the extension portion 28 extending from the first attachment portion 26 in the laterally outward and upward direction, and the second attachment portion 30 attached to the vehicle body side frame 12 at the laterally outer end portion of the extension portion 28, on each side thereof.

According to this configuration in this embodiment, a lateral load to be inputted laterally centrally, for example, from a suspension arm (not shown) toward the longitudinal member 20 can be transmitted in the order of the first attachment portion 26, the extension portion 28, the second attachment portion 30, and the vehicle body side frame 12 (rear side frame 16). As a result, according to this embodiment, it is possible to improve the rigidity and strength for a lateral load transmitted from a suspension arm (not shown) while suppressing an increase in the overall weight of the vehicle and manufacturing cost.

According to this embodiment, the rear cross-member 24 is configured such that the cross-sectional height dimension (H1) at the first attachment portion 26 is larger than the cross-sectional height dimension (H2) at other portion (H1>H2). In this embodiment, the rigidity and strength of the first attachment portion 26 can be enhanced by increasing the cross-section of the first attachment portion 26 whose cross-sectional height dimension is larger than that of the other portion. According to this embodiment, this configuration makes it possible to receive with high rigidity and high strength the lateral load that is first transmitted from a tire suspension to the longitudinal member 20 and thus has the largest initial input load. As a result, according to this embodiment, it is possible to improve the rigidity toughness and the strength toughness against the lateral load from the suspension arm (not shown).

Further, according to this embodiment, the cross-sectional height dimension of the extension portion 28 becomes gradually smaller from the first attachment portion 26 toward the second attachment portion 30. Since the cross-sectional height dimension of the second attachment portion 30 is reduced in this embodiment, the mounting height of the second attachment portion 30 can be minimized, so that the degree of freedom in design layout can be improved with respect to other components.

Furthermore, since the cross-sectional height dimension gradually decreases from the first attachment portion 26 toward the second attachment portion 30, the load transmission efficiency to the vehicle body side frame 12 (rear side frame 16) can be enhanced while preventing a stress concentration at the second attachment portion 30.

Further, according to this embodiment, the rear cross-member 24 has the through opening 32 extending in the longitudinal direction of the vehicle in a position vertically overlapping the first attachment portion 26. The longitudinally rear portion of each of the longitudinal members 20, 20 is inserted through the through opening 32 and attached to the rear cross-member 24. According to this embodiment, since the longitudinal member 20 extends through and is attached to the rear cross-member 24 through the through opening 32 formed in the rear cross-member 24, the rigidity and strength of the first attachment portion 26 can be enhanced.

Further, according to this embodiment, the closed section 25 formed by the upper cross-member portion 24a and the lower cross-member portion 24b is provided in the rear cross-member 24. The upper cross-member portion 24a includes the ceiling wall 42a, the upper bent portion 44, and the upper extension portion 46. The lower cross-member portion 24b includes the lower bottom wall 48a, the lower bent portion 50, and the lower extension portion 52. The upper bent portion 44 is disposed laterally inward of the right and left longitudinal members 20, 20. Meanwhile, the lower bent portion 50 is disposed laterally outward of the right and left longitudinal members 20, 20.

According to this embodiment, this configuration makes it possible to gently form the inclination angle (rising angle) of the upper extension portion 46 that extends from the upper bend portion 44 of the upper cross-member portion 24a to the second attachment portion 30, so that the load transmission efficiency can be improved. Further, providing a steep inclination angle at the lower extension portion 52 that extends from the lower bend portion 50 of the lower cross-member portion 24b to the second attachment portion 30 makes it possible to improve the degree of freedom in design layout with respect to other components while reducing the height dimension of the second attachment portion 30. Further, since the cross-sectional height dimension is increased at a portion where the longitudinal member 20 is attached to the rear cross-member 24 in this embodiment, the rigidity and strength of the first attachment portion 26 can be further improved.

Further, according to this embodiment, the lower extension portion 52 has the bead 54 extending from the lower bent portion 50 toward the second attachment portion 30. According to this configuration in this embodiment, the bead 54 can reinforce the lower bent portion 50 at which stress concentration is likely to occur due to its steep slant. As a result, according to this embodiment, the load transmission efficiency of the load to be transmitted along the lower bottom wall 48a, the lower bent portion 50, and the lower extension portion 52 of the lower cross-member 24b can be enhanced.

Furthermore, according to this embodiment, the lower surface of the rear floor panel 15 has the slanted side 56 slanting in the laterally central and upward direction. According to this embodiment, a lateral load inputted from the suspension arm (not shown) to the longitudinal member 20 can be transmitted from the vehicle body side frame 12 (rear side frame 16) to the rear floor panel 15 through the slanted side 56. As a result, according to this embodiment, it is possible to improve the rigidity and strength for a lateral load transmitted from a suspension arm (not shown).

DESCRIPTION OF REFERENCE NUMERALS 10 rear subframe (subframe)
12 vehicle body side frame
15 rear floor panel
20 longitudinal member
20e longitudinally rear portion (of longitudinal member)
24 rear cross-member (cross-member)
24a upper cross-member portion
24b lower cross-member portion
25 closed section (of rear cross-member)
26 first attachment portion
28 extension portion
30 second attachment portion
32 through opening
42a ceiling wall
44 upper bent portion
46 upper extension portion
48a lower bottom wall
50 lower bent portion
52 lower extension portion
54 bead
56 slanted side
H1, H2, H3 cross-sectional height dimension

The invention claimed is:

1. A subframe structure comprising:
a pair of right and left vehicle body side frames disposed at side portions of a vehicle body and extending in a longitudinal direction of a vehicle;
a pair of right and left longitudinal members extending along the pair of right and left vehicle body side frames at positions centrally spaced apart in a vehicle width direction for a predetermined distance from the vehicle body side frames; and
a cross-member extending in the vehicle width direction between longitudinally rear portions of the pair of right and left longitudinal members,
wherein
the cross-member has a first attachment portion, an extension portion, and a second attachment portion, the first attachment portion being attached to the longitudinal member, the extension portion extending from the first attachment portion in a laterally outward and upward direction, and the second attachment portion being attached to the vehicle body side frame at a laterally outer end portion of the extension portion, and
the cross-member is configured such that a cross-sectional height dimension (H1) at the first attachment portion is larger than a cross-sectional height dimension (H2) at other portion (H1>H2).

2. A subframe structure comprising:
a pair of right and left vehicle body side frames disposed at side portions of a vehicle body and extending in a longitudinal direction of a vehicle;
a pair of right and left longitudinal members extending along the pair of right and left vehicle body side frames at positions centrally spaced apart in a vehicle width direction for a predetermined distance from the vehicle body side frames; and
a cross-member extending in the vehicle width direction between longitudinally rear portions of the pair of right and left longitudinal members,
wherein
the cross-member has a first attachment portion, an extension portion, and a second attachment portion, the first attachment portion being attached to the longitudinal member, the extension portion extending from the first attachment portion in a laterally outward and upward direction, and the second attachment portion being attached to the vehicle body side frame at a laterally outer end portion of the extension portion, and
a cross-sectional height dimension of the extension portion becomes smaller from the first attachment portion toward the second attachment portion.

3. A subframe structure comprising:
a pair of right and left vehicle body side frames disposed at side portions of a vehicle body and extending in a longitudinal direction of a vehicle;
a pair of right and left longitudinal members extending along the pair of right and left vehicle body side frames at positions centrally spaced apart in a vehicle width direction for a predetermined distance from the vehicle body side frames; and
a cross-member extending in the vehicle width direction between longitudinally rear portions of the pair of right and left longitudinal members,
wherein
the cross-member has a first attachment portion, an extension portion, and a second attachment portion, the first attachment portion being attached to the longitudinal member, the extension portion extending from the first attachment portion in a laterally outward and upward direction, and the second attachment portion being attached to the vehicle body side frame at a laterally outer end portion of the extension portion, and
the cross-member has a through opening extending in the longitudinal direction of the vehicle in a position vertically overlapping the first attachment portion, and
wherein the longitudinal member is inserted through the through opening and attached to the cross-member.

4. The subframe structure according to claim 1, wherein the cross-member includes an upper cross-member portion and a lower cross-member portion, and the upper cross-member portion and the lower cross-member portion form a closed section,
wherein the upper cross-member portion includes a ceiling wall, an upper bent portion provided at a laterally outer end portion of the ceiling wall, and an upper extension portion extending from the upper bent portion in a laterally outward and upward direction,
wherein the lower cross-member portion includes a lower bottom wall, a lower bent portion provided at a laterally outer end portion of the lower bottom wall, and a lower extension portion extending from the lower bent portion in a laterally outward and upward direction,
wherein the upper bent portion is disposed laterally inward of the right and left longitudinal members, and wherein the lower bent portion is disposed laterally outward of the right and left longitudinal members.

5. The subframe structure according to claim 4, wherein the lower extension portion has a bead extending from the lower bent portion toward the second attachment portion.

6. The subframe structure according to claim 1, further comprising a rear floor panel mounted between the pair of right and left vehicle body side frames,
wherein a lower surface of the rear floor panel has a slanted side slanting in a laterally central and upward direction.

7. The subframe structure according to claim 2, wherein the cross-member includes an upper cross-member portion and a lower cross-member portion, and the upper cross-member portion and the lower cross-member portion form a closed section,
wherein the upper cross-member portion includes a ceiling wall, an upper bent portion provided at a laterally outer end portion of the ceiling wall, and an upper extension portion extending from the upper bent portion in a laterally outward and upward direction,
wherein the lower cross-member portion includes a lower bottom wall, a lower bent portion provided at a laterally outer end portion of the lower bottom wall, and a lower extension portion extending from the lower bent portion in a laterally outward and upward direction,
wherein the upper bent portion is disposed laterally inward of the right and left longitudinal members, and
wherein the lower bent portion is disposed laterally outward of the right and left longitudinal members.

8. The subframe structure according to claim 7, wherein the lower extension portion has a bead extending from the lower bent portion toward the second attachment portion.

9. The subframe structure according to claim 2, further comprising a rear floor panel mounted between the pair of right and left vehicle body side frames,
wherein a lower surface of the rear floor panel has a slanted side slanting in a laterally central and upward direction.

10. The subframe structure according to claim 3, wherein the cross-member includes an upper cross-member portion and a lower cross-member portion, and the upper cross-member portion and the lower cross-member portion form a closed section,
wherein the upper cross-member portion includes a ceiling wall, an upper bent portion provided at a laterally outer end portion of the ceiling wall, and an upper extension portion extending from the upper bent portion in a laterally outward and upward direction,
wherein the lower cross-member portion includes a lower bottom wall, a lower bent portion provided at a laterally outer end portion of the lower bottom wall, and a lower extension portion extending from the lower bent portion in a laterally outward and upward direction,
wherein the upper bent portion is disposed laterally inward of the right and left longitudinal members, and
wherein the lower bent portion is disposed laterally outward of the right and left longitudinal members.

11. The subframe structure according to claim 10, wherein the lower extension portion has a bead extending from the lower bent portion toward the second attachment portion.

12. The subframe structure according to claim 3, further comprising a rear floor panel mounted between the pair of right and left vehicle body side frames,
wherein a lower surface of the rear floor panel has a slanted side slanting in a laterally central and upward direction.

\* \* \* \* \*